(No Model.)

H. H. HEMPLER.
CONNECTING SPRING FOR EYEGLASS FRAMES.

No. 515,146. Patented Feb. 20, 1894.

Witnesses:
J. Stewart Brown
Geo. S. Foster

Inventor.
Henry H. Hempler.

UNITED STATES PATENT OFFICE.

HENRY H. HEMPLER, OF WASHINGTON, DISTRICT OF COLUMBIA.

CONNECTING-SPRING FOR EYEGLASS-FRAMES.

SPECIFICATION forming part of Letters Patent No. 515,146, dated February 20, 1894.

Application filed April 4, 1892. Serial No. 427,766. (No model.)

*To all whom it may concern:*

Be it known that I, HENRY H. HEMPLER, a citizen of the United States, residing at Washington, in the District of Columbia, have invented certain new and useful Improvements in Connecting-Springs for Eyeglass-Frames; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a certain new and useful improvement in "connecting spring for eye-glass frames," and has for its object to produce, by means of its peculiar construction, better results in retaining the glasses upon the nose.

It is a well known fact that in the ordinary eye-glass frames the connecting spring, or nose piece, which secures the two parts together, has a tendency, when in position on the nose, to come in contact with that portion of the forehead between the eyebrows and to cause the eye-glass to tilt and consequently fall off. By means of my improvement this difficulty is obviated. The spring, by its peculiar construction, operates to set the frames well upon the nose and under the brows, enabling the glasses to be retained closer to the eyes, thus obtaining a better focus and firmer seat in position, and, at the same time, without in any manner interfering with the forehead.

Figure 1:
Figure 2:
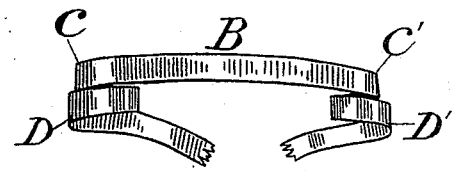

In the accompanying drawings: Figure 1 is a perspective view of an eye-glass adjusted for use, showing my improved spring attached to the frames. Fig. 2 is an enlarged detached view of the spring, showing its manner of construction.

The spring B, which is simple in construction and of any desirable material, is bent at the points C and C' under and backward in a circular turn, forming an inwardly extending spiral at each side of its center, which projects the main body of the spring outward from the loops D and D' thus formed. The ends of the spring are fastened to the frames in the ordinary manner. This construction of the spring causes that part of the same which crosses the nose to project outward from a direct line with the glasses, thereby producing the results desired.

Having fully described my invention, what I claim, and desire to secure by Letters Patent, is—

1. Eyeglasses or spectacles having bridge parts of flattened wire with spring spiral coils at their ends.

2. A connecting spring for eye glass frames composed of a flat piece of spring material formed into an inwardly extending spiral at each side of its center and its ends extended downward and connected with the inner sides of the frames, substantially as shown and described.

In testimony whereof I affix my signature in presence of two witnesses.

HENRY H. HEMPLER.

Witnesses:
   GEO. T. FOSTER,
   FRED. C. HEMPLER.